United States Patent [19]

King

[11] 3,723,697
[45] Mar. 27, 1973

[54] INFRA-RED SOLDERING APPARATUS INCORPORATING PRESSURE APPLYING STRUCTURE-THERETO

[75] Inventor: Frank Kennedy King, Broadstone, England

[73] Assignee: Plessey Handel Und Investments A.G., Zug, Switzerland

[22] Filed: Nov. 18, 1971

[21] Appl. No.: 199,877

[30] Foreign Application Priority Data

Dec. 22, 1970 Great Britain.................60,933/70

[52] U.S. Cl. .....................219/85, 29/626, 219/347
[51] Int. Cl. ...........................................B23k 1/02
[58] Field of Search ...219/85, 347, 349, 354; 29/626

[56] References Cited

UNITED STATES PATENTS 3,509,317   4/1970   Valsamakis et al..............219/347 X
3,529,117   9/1970   Costello..............................219/85
3,374,531   3/1968   Bruce..................................219/85 X

*Primary Examiner*—J. V. Truhe
*Assistant Examiner*—L. A. Schutzman
*Attorney*—Samuel Scrivener, Jr. et al.

[57] ABSTRACT

To ensure good pressure distribution to the individual conductor pairs to be solder-joined when effecting infrared-light soldering of a set of conductors on a flexible infrared-pervious substrate to a second set of conductors on a second substrate, a strip-type focussed infra-red source is equipped with a pressure pad which is pivotally supported by trunnions resting on pressure application spring bars, and which consist of a quartz bar fitted at its pressure-transmission face with a pressure-distribution pad made of SYLGARD 182 silicone resin, a material which has a high infra-red transmission combined with good resilience and temperature resistance.

2 Claims, 1 Drawing Figure

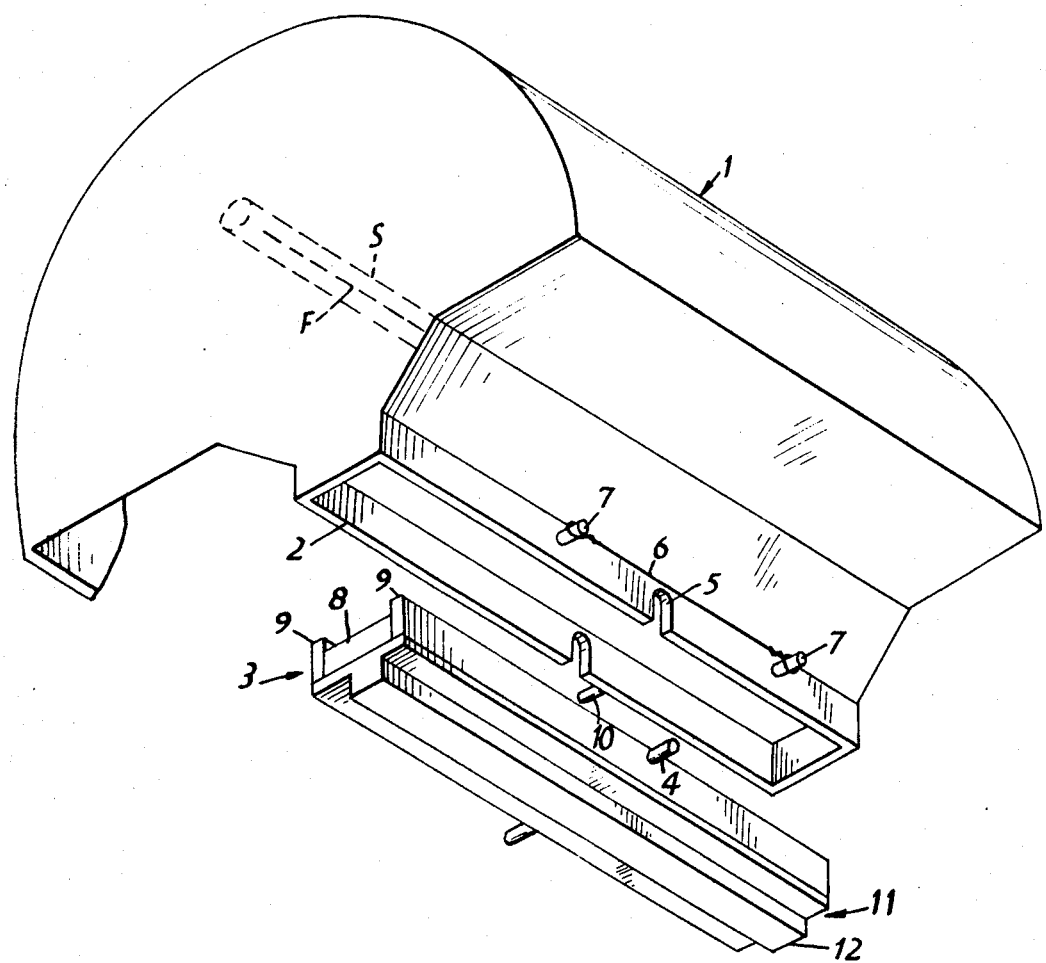

INFRA-RED SOLDERING APPARATUS INCORPORATING PRESSURE APPLYING STRUCTURE-THERETO

This invention relates to infrared soldering apparatus and has for an object to provide improved apparatus for the simultaneous establishment of soldered connections between each of a number of pairs of conductor elements respectively positioned at mutually-facing surfaces of a pair of substrates of which at least one is flexible and pervious to infrared radiation. The improved apparatus can, for example, be employed for the simultaneous soldering of the various conductors at the end of a length of flexible flat cable to appropriately arranged conductors on a printed-circuit board or other electrical component.

In order to effect soldering operations of this kind, it has previously been proposed to employ a unit containing a cylindrical mirror of elliptical profile in whose focal line closest to the mirror surface a rectilinear source of infrared light was arranged so that the mirror would focus the light on to the second focal line, at a greater distance from the surface of the mirror, and the connections to be soldered were arranged on a support surface, on which they were held in place by a bar-like pressure pad of rigid, infrared-pervious material such as quartz. This pressure pad was supported at its two ends on the body providing the support surface, and the connections to be soldered were thus clamped between this surface and the pressure pad. The light unit was then placed in such a position relative to the support surface that the second line of focus of its reflector coincided with the line on the support surface on which the connections were arranged, so that the infrared radiation from the reflector passed through the infrared-pervious material of the pressure pad to the connections to be soldered, and in order to make the pressure applied to the individual connection more uniform in the case of slight irregularities in the thickness of the individual connections, it has also been proposed to provide the pressure pad, at the side facing the connections, with a lining of material which has rubber-like resilience in addition to being pervious to infrared radiation and resistant to relatively high temperatures, transparent silicone rubber being one highly suitable material.

The present invention has for an object to provide an improved apparatus for effecting soldering by infrared heat, which permits soldering operations along a plurality of lines to be effected in quick succession with a minimum requirement of operator's skill.

In order that the invention may be more readily understood, one form of suitable apparatus will not be described in more detail by way of example with reference to the accompanying drawing, which is a somewhat fragmentary exploded perspective view of the part of the apparatus which contains the infrared-radiation source and the infrared-pervious pressure pad for application to the rear surface of the flexible substrate at whose front surface one set of the conductors to be soldered together is exposed.

Referring now to the drawing, 1 is an infrared unit which is a focussed radiant infrared heating system known under the Trade Mark CONRAY as a standard product from Federal Tool Engineering Company. It includes a 6 kW linear infrared source S arranged along one focal line of a gold-plated elliptic reflector I which focusses the radiation from a linear filament F through a rectangular metal collar 2 on to the other focal line of the reflector. This second line is parallel to the filament and lies in a surface on which the conductors to be soldered are to be placed for the soldering operation.

In order to permit contact pressure to be applied to the sets of conductors that are to be joined by the soldering operation, a pressure pad 3 is provided which fits between the two longitudinal sides of the collar 2 of the lamp housing. The pressure pad has a pair of trunnions 4 which engage into slots 5 of the collar 2 for movement towards and away from the focal line containing the lamp filament F. This enables the pad 3 to transmit to an assembly to be soldered an application force which is exerted upon the trunnions 4 by bar springs 6 against which the trunnions respectively rest. These springs are made of piano wire and are supported on spaced studs 7 projecting from the outer side of the collar 2. This arrangement of the springs and trunnions permits free pivotal movement of the pressure pad 3 about the joint axis of the trunnions 4. A pair of retaining clips 10 are preferably provided at the outer edge of the sides of the metal collar 2 for co-operation with the cheek plates 9 for retaining the pressure pad in the collar and preventing the trunnions 4 from leaving the slots 5.

The pressure pad itself is built up in two layers. A first layer is constituted by a quartz-glass bar 8 of substantially rectangular cross-section, and the second layer consists of a T-profile bar 11 of the resilient infrared-pervious silicone resin which is supplied under the proprietary name SYLGARD 182 by the Dow Corning Corporation. It is attached to the quartz-glass bar 8 by means of cheek plates 9 which are attached to the longitudinal sides of the quartz-glass bar 8, and which carry the trunnions 4. The maximum thickness of the T-profile bar 11 in its center or web portion is approximately ¼ inch, a thickness which has been found amply sufficient to ensure in practice the required degree of uniformity of contact pressure between a number of pairs of conductors to be soldered together. It has been found in practice that in the case of so-called re-flow soldering, in which the soldering is effected by means of solder previously applied to the surfaces to be joined, satisfactory soldering can be achieved without substantial deterioration of the pressure-distribution pad 12, so that this pad can be used again and again until replacement is made necessary by wear. This results in a considerable saving of time compared with the previously proposed use of PTFE sheets, which require to be replaced after each operation. An added advantage of the invention is that while PTFE sheets are liable to emit fumes harmful to the reflector, it largely avoids the emission of such fumes so that with the apparatus of the invention it is much less frequently necessary to clean the reflector. Moreover, the heat-distribution pads of the present invention can be manufactured by moulding at a comparatively low cost, thus further reducing expenses compared with the replacement after each soldering operation of the relatively expensive PTFE sheets previously employed.

I claim:

1. An infrared soldering apparatus for the simultaneous establishment of a plurality of soldered connections arranged along a straight line on a support surface, which comprises; a housing structure having a light-outlet opening; an elliptic-cylinder reflector supported in said structure to face said opening; a linear infra-red source supported in said structure with the axis of said source extending along that focal line of the reflector which is nearest to the reflector surface; a pressure pad including an elongated body of rigid infrared-pervious material and a lining of resilient, heat-resistant, infrared-pervious material, said lining having one surface in close contact with said body on an opposite surface for simultaneously engaging a plurality of connections when such connections are placed along a straight line on a support surface, said pressure pad having, at a central point of its length, a pair of trunnions extending from opposite sides of the pad and aligned along an axis perpendicular to the plane containing the focal lines of the reflector, and said housing structure including a frame surrounding the said opening and said pad, said frame having a pair of slots in which said trunnions are guided for rotation about their axis and for movement towards and away from said source; and spring means interposed between said trunnions and the housing structure to yieldingly urge the trunnions away from the said source.

2. Apparatus as claimed in claim 1, wherein the pressure pad additionally includes a pair of cheek plates, one at each side of said plane, and each carrying one of said trunnions.

* * * * *